United States Patent Office 3,347,074
Patented Oct. 17, 1967

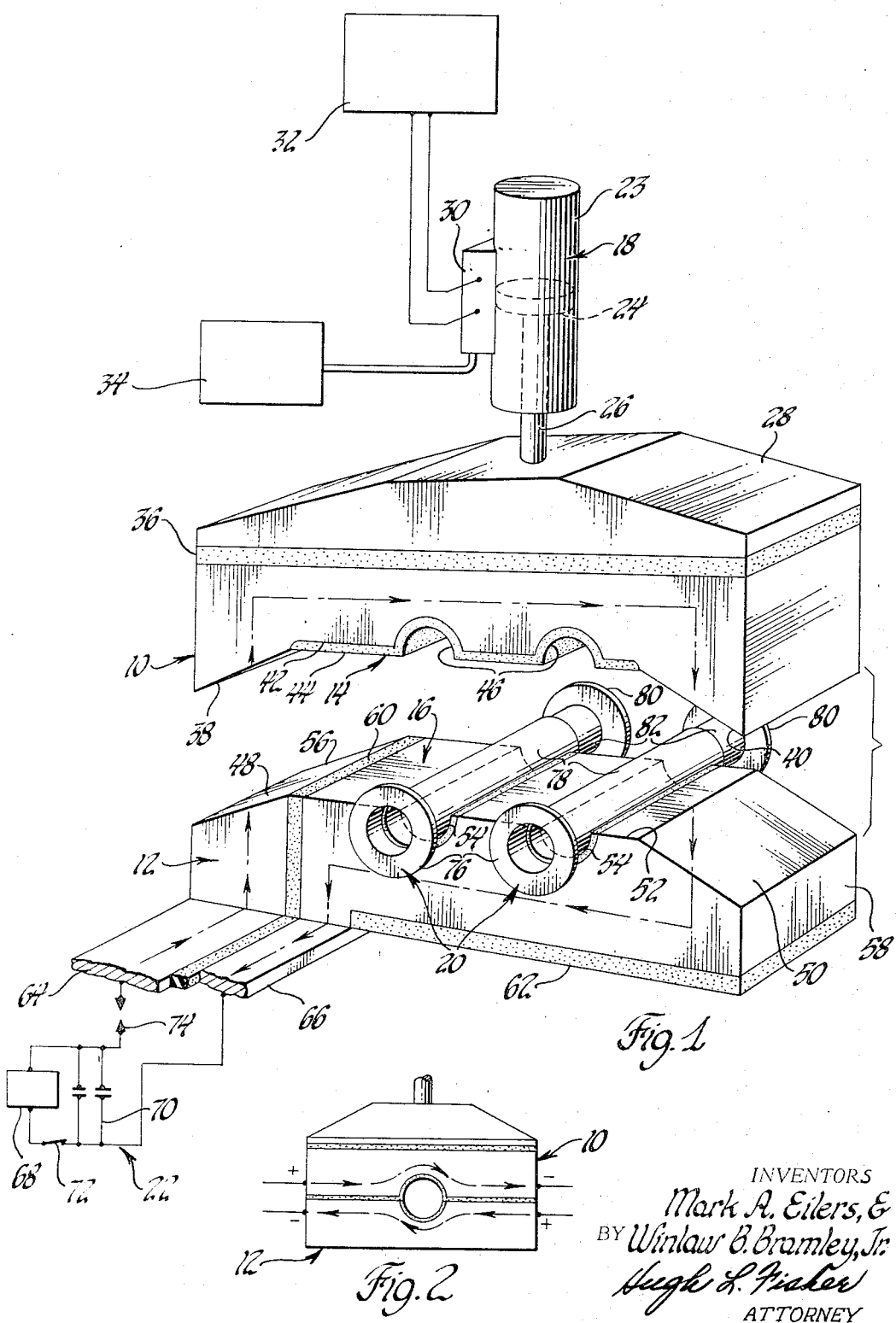

3,347,074
ELECTROMAGNETIC FORMING APPARATUS
AND METHOD
Mark A. Eilers, Warren, and Winlaw B. Bramley, Jr., Milford, Mich., assignors to General Motors Corporation, Detroit, Mich., a corporation of Delaware
Filed Dec. 21, 1964, Ser. No. 419,666
13 Claims. (Cl. 72—56)

ABSTRACT OF THE DISCLOSURE

Method and apparatus for electromagnetically forming a metallic workpiece with a pair of relatively movable and engageable dies. A motor is provided for moving the dies into engagement with the workpiece therebetween. The dies are formed of a conductive material and perform as a part of the primary electric circuit for generating the high intensity magnetic fields for forming the workpiece to a desired shape.

---

This invention relates to improved method and apparatus for electromagnetically forming metallic workpieces.

The electromagnetic forming process involves the use of a forming coil to surround that part of the metallic workpiece to be formed. When high amperage current pulses are supplied to the coil a high intensity magnetic field is developed and the resultant magnetic pressure forms the workpiece. Although the process has many diverse applications, it is limited because of the shape of the forming coil itself. Obviously, certain irregularly shaped workpieces either cannot be inserted within the coil or the formed assemblage cannot be withdrawn; e.g., if two parts to be joined each has end flanges of a larger diameter than the coil the final assemblage cannot be withdrawn from the coil.

It is, therefore, proposed to provide novel method and apparatus for electromagnetically forming such workpieces. More specifically, apparatus is contemplated utilizing two relatively movable dies that when engaged surround the workpiece and provide an appropriate path for current around the workpiece such that a high intensity magnetic field can be generated for forming the workpiece.

Also contemplated is apparatus having a pair of relatively movable dies each of which have engaging surfaces that together define a recess for the workpiece and each of which contribute a path for current proximate the recess such that a high intensity magnetic field can be created within the recess for magnetically forming the workpiece.

The foregoing and other objects and advantages of the invention will become apparent from the following description and from the accompanying drawing, in which:

FIGURE 1 illustrates schematically apparatus incorporating the principles of the invention; and, FIGURE 2 depicts schematically a modification of the apparatus.

Referring now to the drawing, the numeral 10 denotes generally a movable die and the numeral 12 a fixed die, both made of a highly conductive material, such as copper. These dies 10 and 12, respectively, have complementary engaging surfaces 14 and 16. A suitable linear motor 18 maneuvers the movable die 10 so as to move the surfaces 14 and 16 into and out of engagement. When the surfaces 14 and 16 are in engagement and workpieces, viewed generally at 20, are in place high amperage current pulses from a power source 22 generate, as will be further explained, a high intensity magnetic field that provides the desired forming of the workpieces 20.

The motor 18 may be operated in any desired way, e.g., electrically or by fluid pressure. If the latter, a cylinder 23 with a piston 24 slidably mounted therein is employed. A piston rod 26 connects the piston 24 to a bracket 28. A conventional force motor 30 operated by a suitable control 32 can selectively supply fluid under pressure from a source 34 either to the upper side or the lower side of the piston 24 to cause corresponding movement of the bracket 28. The bracket 28 is in turn connected to and electrically insulated from the die 10 by an insulator strip 36.

Considering now the details of the dies 10 and 12, the engaging surface 14 has at each end downwardly tapering contact surfaces 38 and 40, and an intermediate surface 42 that is provided with an insulator strip 44. One or more insulated depressions 46 are provided in the surface 42. The engaging surface 16 on the fixed die 10 has end contact surfaces 48 and 50 that also taper downwardly so as to respectively mate with the contact surfaces 38 and 40 on the movable die 10. An intermediate surface 52 engages the insulator strip 44 on the movable die 10. Similar to the intermediate surface 42 the surface 52 is provided with insulated depressions 54 that align with the depressions 46 to provide annular recesses for receiving the workpieces 20.

The fixed die 12, which can be placed on any suitable support (not shown), is formed in two sections denoted by the numerals 56 and 58. These sections 56 and 58 are electrically insulated from each other by an insulating strip of material 60. Additionally, an insulator strip 62 can be provided, if needed, at the bottom of the section 58 to isolate this section from support. Input and output terminals 64 and 66, each of which may be in the form of copper bus bars, current respectively, the sections 56 and 58 to the power supply 22.

The power supply 22 may be of any known type that can provide high amperage current pulses to the terminals 64 and 66. The illustrated power supply 22 employs a high voltage power supply 68, a capacitor bank 70, a switch 72 and a spark gap 74. The capacitor bank 70 can, of course, be replaced by a motor-generator set or some other suitable pulse source while the spark gap 74 could be replaced by a similarly functioning switch device, such as a thyratron, a silicon controlled rectifier or an ignitron. With this power supply 22, when the switch 72 is closed, current at the voltage of the power supply 68, e.g., 10 kv., is supplied to the capacitor bank 70. The capacitor bank 70 will charge until at some predetermined voltage the spark gap 74 breaks down and becomes conductive. At this time a current pulse of high amperage, such as 100,000 amps., is supplied to the terminals 64 and 66. This current pulse will have a duration of only a few microseconds and will traverse the current path shown by the broken lines and arrows. This current path around the dies 10 and 12 in effect is similar to that from a single turn coil. As a result a magnetomotive force is produced of a sufficient magnitude to create the required high intensity magnetic field within the recesses containing the workpieces 20. This magnetic field induces current in the surfaces of the workpieces 20, a current which generates a secondary magnetic field that interacts with the primary magnetic field from the current flowing in the dies 10 and 12. This interaction of the two fields produces a magnetic pressure that urges the surfaces of the workpieces 20 inwardly.

For demonstrating the invention, each of the workpieces 20 is shown formed in two sections that are to be permanently joined by the magnetic pressure. One section has an enlarged flange 76 with a tubular body 78. The other section has an enlarged flange 80 and a tubular body 82 that fits inside the tubular body 78. The magnetic pressure crimps the tubular bodies 78 and 82 together. If required, e.g., because of minimum inside diameter requirements, a mandrel of any suitable construction can be inserted within the assemblage and the magnetic pressure will force the bodies 78 and 82 together against the mandrel. As can be appreciated the enlarged flanges 76 and 80 have a greater diameter than the inside diameter of the conventional coil required for joining the bodies 78 and 82, keeping in mind that the coil must be as close as possible to the workpiece if an effective coupling is to be made. Hence, the final assemblage could not be removed from this conventional coil. Of course, with the die 10 being made movable, when the assemblage is made, the motor 18 can be actuated and the die 10 moved upwardly so that the workpieces 20 can be removed.

Summarizing a cycle of operation, with the dies 10 and 12 in their illustrated positions the workpieces 20 are inserted in the depressions 54 and the fixed die 12. The control 32 is operated so as to cause the motor 18 to move the die 10 downwardly until the surfaces 14 and 16 are engaged. The opposite surfaces 38 and 48 and 40 and 50 are in electrical contact while the intermediate surfaces 42 and 52 are electrically isolated from each other by the insulator strip 44. Next, the switch 72 is closed to initiate the charging of the capacitor bank 70. When the spark gap 74 breaks down, current flows along the path, denoted by the broken lines and arrows, starting from the input terminal 64 and continuing to the fixed die section 56 via the contacting surfaces 38 and 48. The current then proceeds across the die 10, back through the contacting surfaces 40 and 50, and finally by way of the lower die section 58 to the output terminal 66. The resultant magnetic pressure depresses the cylindrical body 78 onto the cylindrical body 82 producing the one piece assemblage.

In the FIGURE 2 modificaiton, each die 10 and 12 is shown individually connected to the source 22 so that each is supplied simultaneously with a current pulse. By appropriately connecting the dies 10 and 12 to the source 22 in a way well understood by those versed in the art, the indicated polarities can be obtained and current flow will be in the designated directions. Thus the magnetic fields from each will be alike and, therefore, additive.

From the foregoing it will be appreciated that method and apparatus are provided for forming irregularly shaped workpieces that could not otherwise be either inserted within or withdrawn from the conventional magnetic forming coil. This method and apparatus also, in effect, provides a split single turn forming coil and thus provides a very simplified and inexpensive structure for forming either large or small pieces. Moreover, the method and apparatus are particularly adapted for mass production usge.

The invention is to be limited only by the following claims.

What is claimed is:

1. Apparatus for electromagnetically forming a metallic workpiece comprising, in combination a pair of relatively movable and engageable dies formed of a conductive material, and so arranged when engaged as to serve as conductors by providing current paths around the workpiece, means maneuvering the dies into and out of engagement, and an energy source connected directly to the dies and operative to supply thereto high amperage current pulses, so that the current flow through the dies creates high intensity magnetic fields for forming the workpiece.

2. Apparatus for electromagnetically forming a metallic workpiece comprising, in combination, a pair of relatively movable and engageable dies formed of a conductive material and having the surfaces thereof cooperating to define a common recess for the workpiece and arranged to form a single turn conductor for electric current around the recess when the dies are engaged, means maneuvering the dies into and out of engagement, and an energy source so connected to the dies as to supply high amperage electric current pulses thereto so that current around the single turn creates high intensity magnetic fields within the recess for forming the workpiece.

3. Apparatus for electromagnetically forming a metallic workpiece comprising, in combination, a pair of relatively movable and engageable dies formed of a conductive material and so arranged when engaged as to define a recess for the workpicee and serve as conductors by providing current paths around the recess, means maneuvering the dies into and out of engagement, and an energy source connected directly to the dies and operative to supply high amperage current pulses thereto of a polarity that produces additive high intensity magnetic fields within the recess for forming the workpiece.

4. Apparatus for electromagnetically forming a metallic workpiece comprising, in combination, a pair of relatively movable and engageable dies formed of a conductive material and having symmetrically formed surfaces insulated from each other and cooperating to define a common recess for the workpiece, each die serving as a conductor by providing a current path within the vicinity of the recess when the dies are engaged, means maneuvering the dies into and out of engagement so as to permit the workpiece to be installed and removed from the recess, and an energy source connected directly to both dies as to cause the current to flow therein in the direction that produces within the recess high intensity magnetic fields for forming the workpiece.

5. Apparatus for electromagnetically forming a metallic workpiece comprising, in combination, a pair of relatively movable and engageable dies, the dies having complementary engaging surfaces defining a recess for the workpiece when the dies are engaged, the dies being electrically insulated from each other and formed of a highly conductive material so as to serve as conductors, means maneuvering the dies into and out of engagement, and an energy source connected directly to each die as to supply high amperage current pulses thereto, the current pulses to each die following a path around the recess so as to produce a cumulative high intensity magnetic field within the recess for forming the workpiece.

6. Apparatus for electromagnetically forming a metallic workpiece comprising, in combination, a pair of relatively movable and engageable dies formed of a conductive material, each die serving as a conductor and being provided with complementary forming surfaces defining a recess for the workpiece and electrically contacting surfaces so arranged as to provide a current single turn path around the recess and between the dies when the contacting surfaces are in engagement, means maneuvering the dies into and out of engagement, and an energy source connected directly to the dies so as to supply high amperage current pulses thereto, the high amperage current pulses following the current path so as to create a high intensity magnetic field within the recess for forming the workpiece.

7. Apparatus for electromagnetically forming a metallic workpiece comprising, in combination, a pair of relatively movable and engageable dies having complementary engaging surfaces defining a recess for the workpiece, the engaging surfaces having the portions thereof on opposite sides of the recess and in electrical contacting engagement and the remaining portions thereof electrically insulated from each other, one of the dies having a pair of electrically insulated sections arranged to form as input and output current terminals so as to provide a continuous path for current extending from the input terminal to the output terminal by way of the other die and around the recess so as to generate a magnetic field therein for forming the workpiece when the dies are engaged, means moving the dies into and out of engagement so as to permit workpieces to be installed and removed from the recess, and an energy source connected to the input and output terminals so as to supply thereto a high amperage current pulse for creating the high intensity magnetic field within the recess.

8. Apparatus for electromagnetically forming a metallic workpiece comprising, a fixed die and a movable die, the dies having a pair of complementary tapered engaging surfaces at each end and complementary engaging intermediate surfaces electrically insulated from each other and defining a recess for the workpiece, the fixed die having two electrically insulated sections so as to provide input and output terminals for current and thus afford when the dies are engaged a continuous current path extending from the input terminal across the pair of engaging surfaces at one end of the dies to the movable die and back through the pair of engaging surfaces at the other end of the dies to the output terminal and thus generate a magnetic field within the recess when current is supplied to the input terminal, motor means for moving the movable die into and out of engagement with the fixed die so that workpieces may be installed and removed from the recess, and a high amperage current pulse source connected across the input and output terminals so as to generate a high intensity magnetic field within the recess for forming the workpiece.

9. Apparatus for electromagnetically forming a metallic workpiece comprising, in combination, a pair of relatively movable and engageable dies, the dies being formed of a conductive material having complementary engaging surfaces defining a recess for the workpiece, one of the dies having input and output sections electrically insulated from each other and so arranged as to combine with the other die and provide a single turn conductor for current extending from the input section to the output section by way of the other die and around the recess so as to generate magnetic fields within the recess for forming the workpiece, means maneuvering the dies into and out of engagement, and an energy source connected across the input and output sections so as to supply a high amperage current pulse thereto for creating the magnetic field within the recess.

10. The method of electromagnetically forming a workpiece comprising, the steps of engaging a pair of conductive dies so as to surround the workpiece and serve as conductors for current around the workpiece and connecting the dies to a high amperage current pulse source so that the current flow through the dies will generate high intensity magnetic fields within the recess for forming the workpiece.

11. The method of electromagnetically forming a workpiece with two relatively movable and engageable conductive dies that together define a recess for the workpiece when engaged, the method comprising the steps of moving the dies into engagement with certain parts thereof electrically isolated so as to form a single turn conductor for current around the woirkpiece, and connecting the dies to a high amperage current pulse source so that the current flow around the single turn will generate high intensity magnetic fields for forming the workpiece to a desired shape.

12. The method of electromagnetically forming a workpiece comprising the steps of installing a workpiece between two relatively movable dies formed of a conductive material, moving the dies into engagement with certain parts thereof electrically isolated so as to form a single turn conductor for current around the wokpiece, and connecting the dies to a high amperage current pulse source so that the current flow around the single turn will generate high intensity magnetic fields for forming the workpiece into a desired shape.

13. The method of electromagnetically forming a workpiece comprising the steps of installing a workpiece within a recess provided within one of two relatively movable dies formed of a highly conductive material, moving the dies into electrically insulated engagement so as to provide individual proximately parallel current paths each extending around a portion of the workpiece, and connecting the dies individually to a source of high amperage opposite polarity current pulses so that the current flowing along the current path in one die is in the opposite direction of the current flowing in the other die and additive high intensity magnetic fields are produced for forming the workpiece.

References Cited
UNITED STATES PATENTS

| | | | |
|---|---|---|---|
| 2,171,014 | 2/1965 | Ducati | 72—56 |
| 3,187,532 | 6/1965 | Furth | 72—56 |
| 3,252,313 | 5/1966 | Eilers et al. | 72—56 |
| 3,253,443 | 5/1966 | Malmberg | 72—56 |

RICHARD J. HERBST, *Primary Examiner.*

UNITED STATES PATENT OFFICE
CERTIFICATE OF CORRECTION

Patent No. 3,347,074                          October 17, 1967

Mark A. Eilers et al.

It is hereby certified that error appears in the above numbered patent requiring correction and that the said Letters Patent should read as corrected below.

Column 2, line 34, for "current" read -- connect --; column 3, line 54, for "usge" read -- usage --; column 4, line 11, for "workpicee" read -- workpiece --; line 51, before "single" strike out "current", and insert the same after "turn" in line 52, same column 4; column 6, line 10, for "woirkpiece" read -- workpiece --.

Signed and sealed this 12th day of November 1968.

(SEAL)
Attest:

Edward M. Fletcher, Jr.                          EDWARD J. BRENNER
Attesting Officer                                 Commissioner of Patents